(12) United States Patent
Kao

(10) Patent No.: US 11,764,815 B2
(45) Date of Patent: *Sep. 19, 2023

(54) TRANSMITTER CIRCUIT, COMPENSATION VALUE CALIBRATION DEVICE AND METHOD FOR CALIBRATING COMPENSATION VALUES

(71) Applicant: Realtek Semiconductor Corp., HsinChu (TW)

(72) Inventor: Tzu-Ming Kao, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,171

(22) Filed: Aug. 24, 2022

(65) Prior Publication Data

US 2023/0253994 A1 Aug. 10, 2023

(30) Foreign Application Priority Data

Feb. 7, 2022 (TW) .................................. 111104258

(51) Int. Cl.
*H04B 1/04* (2006.01)
*H04B 17/11* (2015.01)

(52) U.S. Cl.
CPC ........... *H04B 1/0475* (2013.01); *H04B 17/11* (2015.01)

(58) Field of Classification Search
CPC ........ H04B 1/0475; H04B 17/11; H04B 1/40; H04B 1/0483; H04B 7/0413

USPC .......................................... 375/296–298, 346
See application file for complete search history.

(56) References Cited

U.S. PATENT DOCUMENTS

| | | | |
|---|---|---|---|
| 8,559,488 B1 | 10/2013 | Smaini | |
| 2014/0348265 A1* | 11/2014 | Wang | H03F 3/2178 375/297 |
| 2015/0214987 A1* | 7/2015 | Yu | H04B 1/0475 375/297 |
| 2017/0093346 A1* | 3/2017 | Matsubara | H03F 3/245 |
| 2017/0194990 A1* | 7/2017 | Wang | H04L 27/0014 |
| 2022/0052717 A1* | 2/2022 | Cao | H04B 1/0475 |
| 2022/0345164 A1* | 10/2022 | Kao | H04B 17/24 |

FOREIGN PATENT DOCUMENTS

| | | | | |
|---|---|---|---|---|
| EP | 2754239 B1 * | 10/2015 | ........... | H03F 1/3241 |
| WO | WO-2017167354 A1 * | 10/2017 | ............. | G06F 17/50 |

* cited by examiner

*Primary Examiner* — Emmanuel Bayard
(74) *Attorney, Agent, or Firm* — Winston Hsu

(57) ABSTRACT

A method for calibrating one or more compensation values utilized by a compensation device of a transmitter includes: obtaining a plurality of output signals which were sequentially generated by the transmitter by processing a pair of input signals according to multiple pairs of compensation values as a plurality of feedback signals, where each feedback signal corresponds to one of the multiple pairs of compensation values, determining a plurality of coefficients of a cost function according to the multiple pairs of compensation values and the feedback signals in an operation of calibration; and determining a pair of calibrated compensation values according to the coefficients and providing the pair of calibrated compensation values to the compensation device.

15 Claims, 7 Drawing Sheets

TRANSMITTER CIRCUIT, COMPENSATION
VALUE CALIBRATION DEVICE AND
METHOD FOR CALIBRATING
COMPENSATION VALUES

BACKGROUND OF THE INVENTION

1. Field of the Invention

The invention relates to a method for calibrating compensation values used in a transmitter circuit to reduce the RF impairment of the transmitter circuit.

2. Description of the Prior Art

RF impairment, which includes In-phase and Quadrature-phase (IQ) imbalance and Local Oscillation (LO) leakage, is an issue to be faced in the design of a Zero Intermediate Frequency (Zero-IF) transmitter or zero-IF receiver because it adopts the technology of "direct-up conversion", that is, only one mixing stage is utilized to directly convert the baseband signal to radio frequency signal or only one mixing stage is utilized to directly convert the received RF signal to the baseband signal. The reason of causing the IQ imbalance is that when there is some difference in the in-phase channel response and the quadrature-phase channel response, the two signals passing through the in-phase channel and the quadrature-phase channel will have unequal amplitude or phase gain. The LO leakage is the interference caused by the residual local oscillating signal in the output signal.

Since the causes of IQ imbalance and LO leakage are different, the compensation methods and the parameters to be calibrated for solving the IQ imbalance and the LO leakage are different. In order to efficiently find out the optimal parameters to solve the problems of RF impairment such as the IQ imbalance and LO leakage, a method for calibrating compensation values that is able to be applied to solve different RF impairment problems is required, so as to obtain the corresponding compensation values for handling different RF impairment problems.

SUMMARY OF THE INVENTION

It is an object of the invention to provide a method for calibrating different compensation values applied to solve different RF impairment problems, so as to obtain the corresponding compensation values for handling multiple RF impairment problems in an efficient way by using the same method.

According to an embodiment of the invention, a transmitter circuit comprises a compensation device, at least one transmitting signal processing device and a compensation value calibration device. The compensation device is disposed on a transmitting signal processing path and configured to sequentially process a pair of input signals according to a plurality of pairs of compensation values to generate a plurality of pairs of compensated signals. The at least one transmitting signal processing device is disposed on the transmitting signal processing path and configured to sequentially process the plurality of pairs of compensated signals to generate a plurality of output signals. The compensation value calibration device is coupled to an output terminal of the transmitting signal processing path and configured to sequentially receive the output signals from the output terminal as a plurality of feedback signals and perform a calibration operation according to the feedback signals and the plurality of pairs of compensation values. The compensation value calibration device comprises a digital signal processor coupled to the compensation device. In the calibration operation, the digital signal processor is configured to determine a plurality of coefficients of a cost function according to the plurality of pairs of compensation values and the feedback signals, determine a pair of calibrated compensation values according to the coefficients and provide the pair of calibrated compensation values to the compensation device.

According to another embodiment of the invention, a compensation value calibration device for calibrating one or more compensation values utilized by a compensation device in a transmitter comprises a power spectrum density calculation device and a digital signal processor. The power spectrum density calculation device is configured to perform Fast Fourier Transform (FFT) on a plurality of feedback signals received from the transmitter to generate corresponding frequency domain feedback signals and calculate distribution of energy of the feedback signals in frequency domain based on the frequency domain feedback signals. Each feedback signal corresponds to one of a plurality of pairs of compensation values. The digital signal processor is coupled to the compensation device the power spectrum density calculation device and configured to, in a calibration operation, determine a plurality of coefficients of a cost function according to the plurality pairs of compensation values and the feedback signals, determine a pair of calibrated compensation values according to the coefficients and provide the pair of calibrated compensation values to the compensation device.

According to another embodiment of the invention, a method for calibrating one or more compensation values utilized by a compensation device of a transmitter comprising: obtaining a plurality of output signals which were sequentially generated by the transmitter by processing a pair of input signals according to a plurality of pairs of compensation values as a plurality of feedback signals, wherein each feedback signal corresponds to one of the plurality of pairs of compensation values; determining a plurality of coefficients of a cost function according to the plurality of pairs of compensation values and the feedback signals in a calibration operation; and determining a pair of calibrated compensation values according to the coefficients and providing the pair of calibrated compensation values to the compensation device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
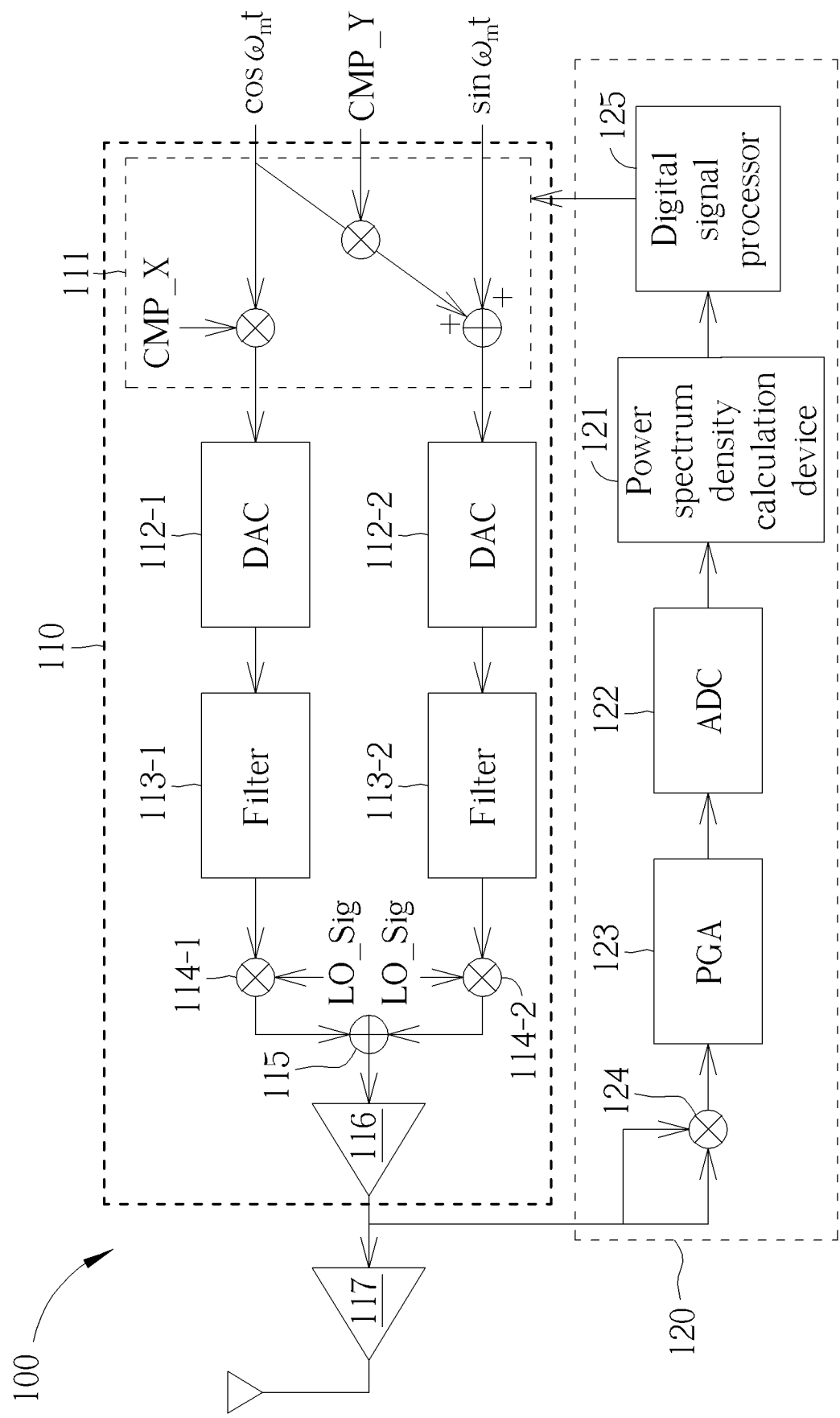
FIG. 1 shows an exemplary transmitter circuit according to an embodiment of the invention.

FIG. 1 shows an exemplary transmitter circuit according to an embodiment of the invention. The transmitter circuit 100 may comprise a transmitting signal processing path 110 and a feedback signal processing path 120. The transmitting signal processing path 110 may comprise a plurality of stages of transmitting signal processing devices configured to process the transmitting signal, as an example, converting a baseband signal to a radio frequency signal. According to an embodiment of the invention, the transmitting signal processing path 110 may comprise a compensation device 111, Digital to Analog Converters (DAC) 112-1 and 112-2, filters 113-1 and 113-2 and mixers 114-1 and 114-2 which are respectively disposed on the in-phase channel and the quadrature-phase channel, an adder 115 and a buffer circuit 116.

The compensation device 111 is disposed on the transmitting signal processing path 110. The compensation device 111 may be configured to receive a pair of input signals comprising a first signal provided to the in-phase channel (I) and a second signal provided to the quadrature-phase channel (Q), perform compensation on the received signals to compensate for the IQ imbalance and thereby generating compensated signals according to a pair of compensation values CMP_X and CMP_Y, wherein the compensation values CMP_X and CMP_Y may be the compensation values respectively provided for compensating for the IQ imbalance in the amplitude or the phase on the in-phase channel and the quadrature-phase channel. As an example, the compensation device 111 may multiply the input signal on the in-phase channel (I) and the compensation value CMP_X together, and multiply the input signal on the in-phase channel (I) and the compensation value CMP_Y together and then add the input signal on the quadrature-phase channel (Q) thereto, so as to compensate for the IQ imbalance on the transmitting signal processing path 110. According to an embodiment of the invention, the compensation values CMP_X and CMP_Y are real numbers.

The DAC 112-1 and the DAC 112-2 on the in-phase channel and the quadrature-phase channel are respectively configured to convert a plurality of input signals that have been compensated from digital domain to analog domain. The filter 113-1 and filter 113-2 are respectively configured to perform filtering on the received signals. The mixer 114-1 and mixer 114-2 are respectively configured to multiply the received signals with an oscillating signal LO_Sig to convert the received signals from baseband to radio frequency signals. The oscillating signal LO_Sig provided to the mixer 114-1 and mixer 114-2 is a collective representation of two signals having the same frequency and quadrature in phase. In the embodiments of the invention, the oscillating signal LO_Sig has an oscillating frequency LO. The adder 115 is configured to combine the signal on the in-phase channel and the signal on the quadrature-phase channel. The buffer circuit 116 may be a driving circuit of the power amplifier 117 to buffer the received radio frequency signal and drive the power amplifier 117 in the subsequent stage. The power amplifier 117 is configured to amplify the radio frequency signal before it is sent out through the antenna.

In the embodiments of the invention, the feedback signal processing path 120 may comprise a plurality of feedback signal processing devices, such as a mixer 124, a Programmable Gain Amplifier (PGA) 123, an Analog to Digital Converter (ADC) 122, a power spectrum density calculation device 121 and a digital signal processor 125. The feedback signal processing path 120 may be coupled to an output terminal of at least one transmitting signal processing device, for example, an output terminal of the buffer circuit 116, to receive an output signal generated by the transmitting signal processing device from the output terminal as a feedback signal and process the feedback signal. The output signal is a signal that have been processed by the aforementioned transmitting signal processing device, including the signal processing respectively performed on the in-phase channel and the quadrature channel. The mixer 124 is configured to multiply the received feedback signal with itself to down convert the feedback signal to the baseband signal. The PGA 123 is configured to amplify (or, attenuate) the received feedback signal. The ADC 122 is configured to convert the feedback signal from analog domain to digital domain. The power spectrum density calculation device 121 is configured to perform FFT on the received feedback signal so as to generate the feedback signal in frequency domain and calculate distribution of energy of the feedback signal in frequency domain based on the frequency domain feedback signal.

The digital signal processor 125 is coupled to the power spectrum density calculation device 121 and the compensation device 111 and is configured to perform a calibration operation according to the feedback signal in frequency domain to calibrate one or more compensation values utilized by the compensation device 111.

In the embodiments of the invention, the power amplifier 117, the antenna and the devices on the transmitting signal processing path 110 may be as a whole regarded as a transmitter, and one or more devices on the feedback signal processing path 120 may be as a whole regarded as a compensation value calibration device to assist the execution of the calibration operation.

As discussed above, since the IQ imbalance may exist on the transmitting signal processing path, the output signal generated by the transmitting signal processing device may comprise energy or power of the unwanted image signal.

Figure 2:
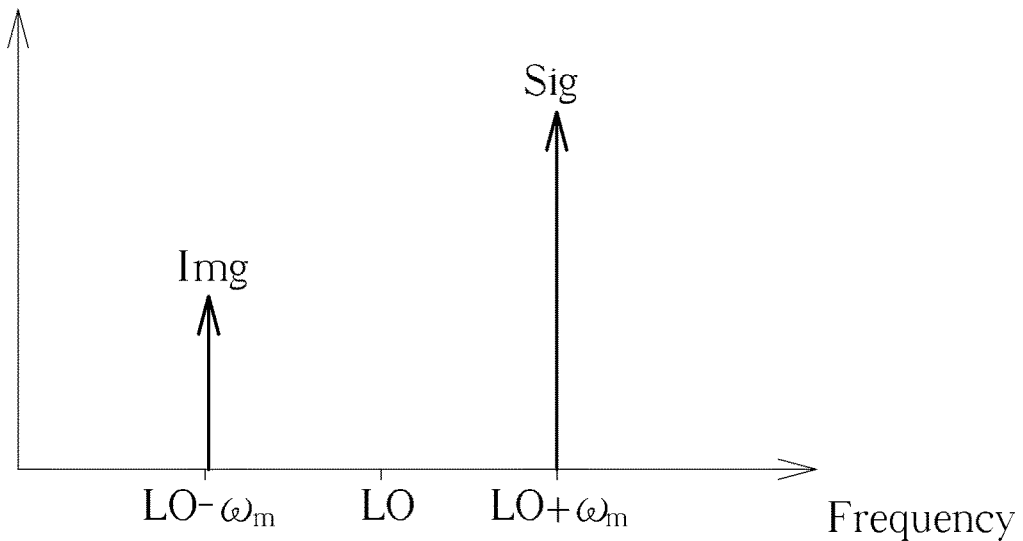
FIG. 2 shows an exemplary frequency spectrum of an RF signal.

FIG. 2 shows an exemplary frequency spectrum of an RF signal. The RF signal may be the one obtained at the output terminal of the buffer circuit 116. Suppose that the input signal Sig represents a pair of single tone signals with angular frequency $\omega_m$, such as the pair of cosine signal cos $\omega_m t$ and the sine signal sin $\omega_m t$ having the angular frequency $\omega_m$ as shown in FIG. 1. Due to the IQ imbalance on the transmitting signal processing path, the spectrum of the RF signal generated on the transmitting signal processing path 110 contains not only the energy (or power) of the original signal Sig at frequency (Lo+$\omega_m$), but also the energy (or power) of the unwanted image signal Img at frequency (Lo−$\omega_m$).

Figure 3:
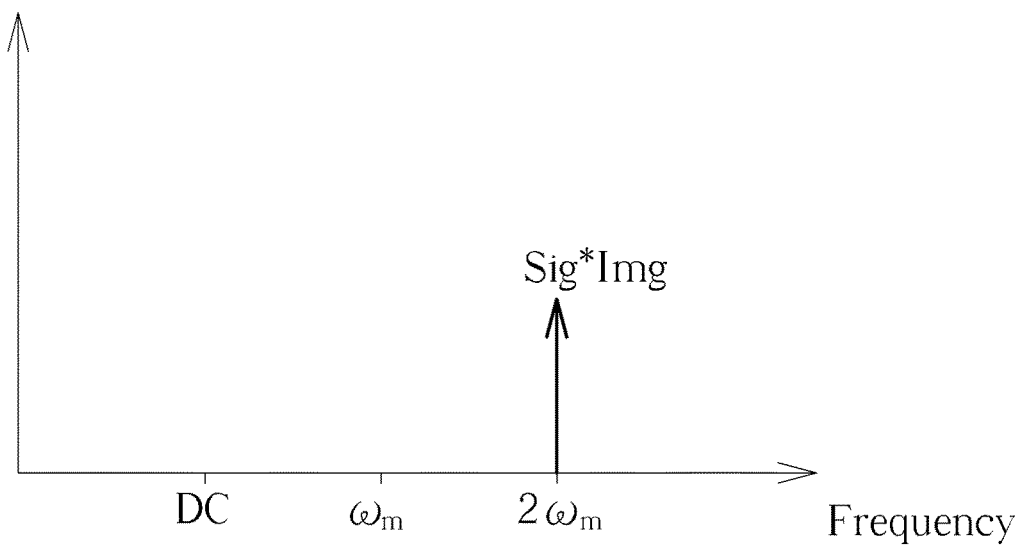
FIG. 3 shows an exemplary frequency spectrum of a feedback signal.

FIG. 3 shows an exemplary frequency spectrum of a feedback signal, which is the feedback signal obtained at the output terminal of the power spectrum density calculation device 121. Due to the existence of the image signal Img, the signal generated after the feedback signal is processed by the mixer 124 has some energy (or power) that cannot be ignored at a frequency ($2\omega_m$), such as the signal Sig*Img at the frequency ($2\omega_m$) as shown in FIG. 3, whose energy (or power) is proportional to the value regarding a multiplication result of the corresponding amplitudes Sig*Img.

Therefore, according to an embodiment of the invention, the compensation device 111 may be configured to perform compensation on the received signals to compensate for the IQ imbalance according to a pair of compensation values CMP_X and CMP_Y, so as to reduce or minimize the energy of the image signal generated on the transmitting signal processing path, thereby solving the problem of IQ imbalance. When processing the RF impairment due to IQ imbalance, the compensation value calibration device may try to minimize the power or energy at the predetermined frequency of the feedback signal which is generated after the processing of the mixer 124, and the predetermined frequency may be twice the input frequency of the input signals. As an example, when the angular frequency of the input signal is $\omega_m$, the predetermined frequency may be twice the angular frequency $2\omega_m$. It is to be noted that the predetermined frequency may vary with the design of the mixer 124. As an example, when the mixer 124 is designed to multiply the feedback signal with a signal having another frequency different from $\omega_m$, the predetermined frequency is adjusted to another value obtained by adding the input frequency and said another frequency or obtained by subtracting said another frequency from the input frequency.

The greater the difference between the energy (or power) of the RF signal at the frequency (LO+$\omega_m$) and the energy (or power) at the frequency (LO−$\omega_m$), the better the image rejection capability of the transmitter circuit 100. Therefore, the compensation device 111 may compensate for the IQ imbalance on the transmitting signal processing path based on the compensation values CMP_X and CMP_Y, so as to suppress the generation of the image signal and reduce the energy of the feedback signal at the frequency $2\omega_m$, and the compensation value calibration device may be configured to calibrate one or more compensation values utilized by the compensation device 111, so as to optimize the compensation result.

Figure 4:
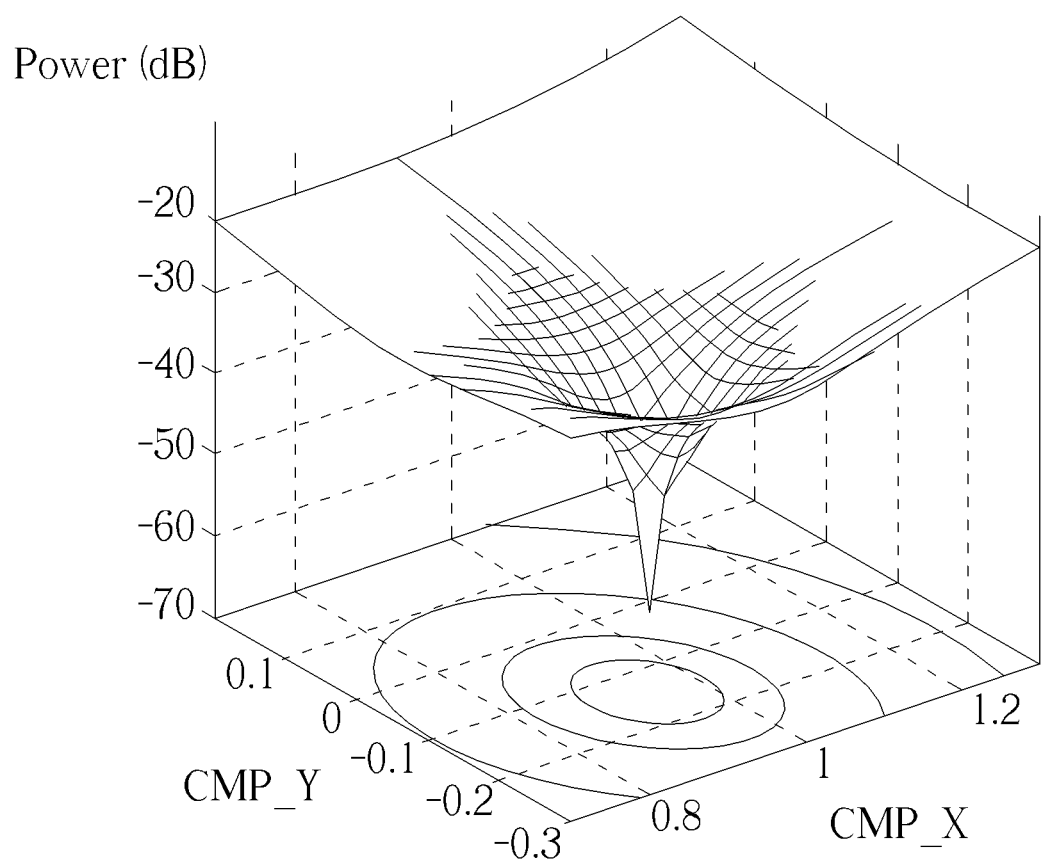
FIG. 4 is a schematic diagram showing the relationship between the IQ imbalance compensation values and the energy of the feedback signal at the aforementioned predetermined frequency.

FIG. 4 is a schematic diagram showing the relationship between the IQ imbalance compensation values CMP_X and CMP_Y and the energy of the feedback signal at the aforementioned predetermined frequency, where the predetermined frequency is twice the input frequency of the input signal. As discussed above, since the energy of the feedback signal at the predetermined frequency is proportional to the image signal Img, the smaller energy of the feedback signal at the predetermined frequency means the better image rejection capability of the transmitter circuit 100. Therefore, in the embodiments of the invention, by finding out the compensation values CMP_X and CMP_Y that make the feedback signal has minimum energy at the predetermined frequency, the problem of IQ imbalance in the transmitter circuit 100 may be solved and the optimum compensation result may be achieved. As shown in FIG. 4, the relationship between the compensation values CMP_X and CMP_Y and the energy of the feedback signal at the aforementioned predetermined frequency may approximate a Quadratic function.

Figure 5:
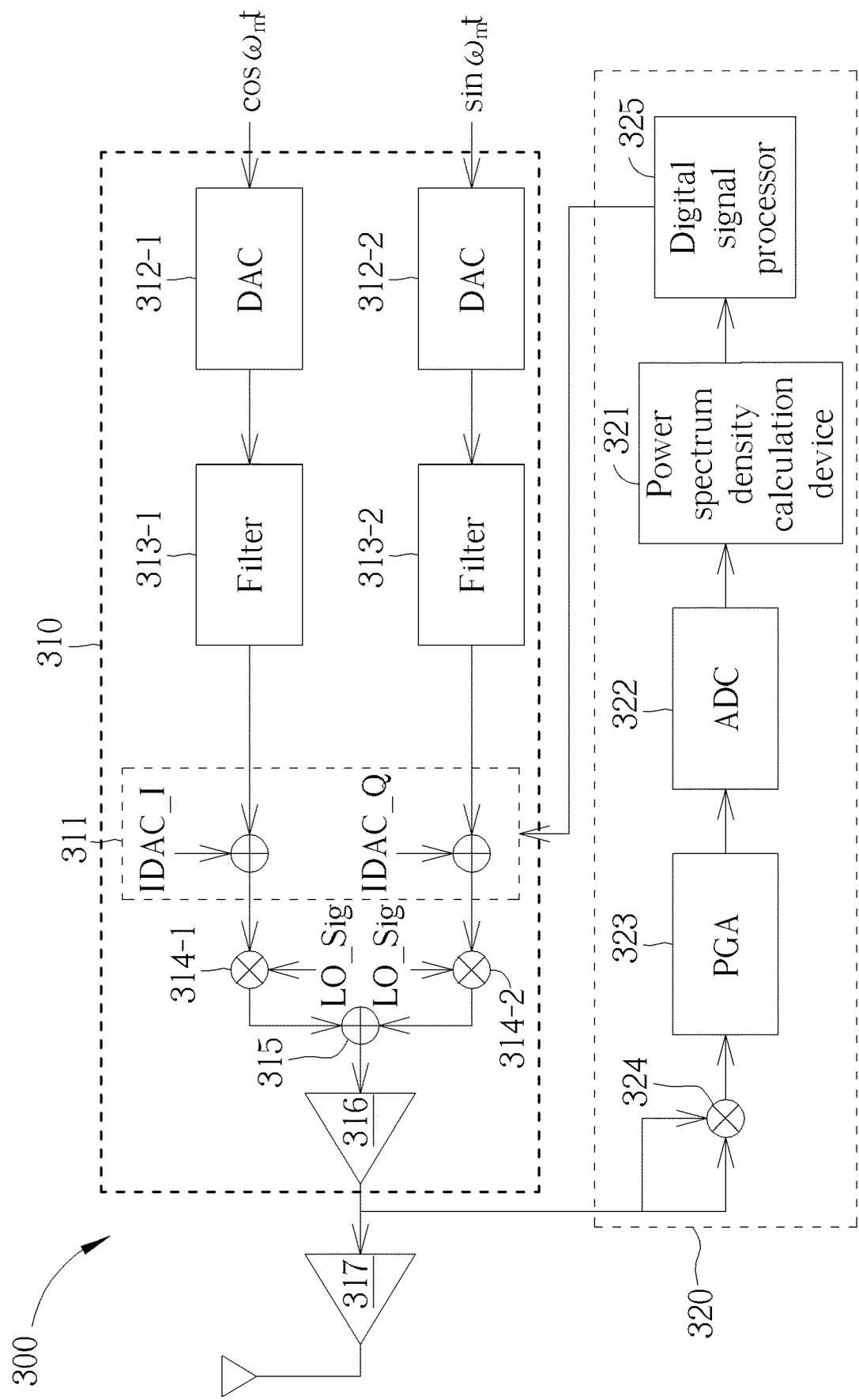
FIG. 5 shows another exemplary transmitter circuit according to an embodiment of the invention.

FIG. 5 shows another exemplary transmitter circuit according to an embodiment of the invention. The transmitter circuit 300 may comprise a transmitting signal processing path 310 and a feedback signal processing path 320. The transmitting signal processing path 310 may comprise a plurality of stages of transmitting signal processing devices configured to process the transmitting signal, as an example, converting a baseband signal to a radio frequency signal. According to an embodiment of the invention, the transmitting signal processing path 310 may comprise Digital to Analog Converters (DAC) 312-1 and 312-2, filters 313-1 and 313-2, a compensation device 311 and mixers 314-1 and 314-2 which are respectively disposed on the in-phase channel and the quadrature-phase channel, and an adder 315 and a buffer circuit 316.

The components comprised in the transmitter circuit 300 and the transmitter circuit 100 are substantially the same, and their structure are similar as well. The only difference is that the compensation device 311 is coupled between the filters 313-1 and 313-2 and the mixers 314-1 and 314-2.

In this embodiment, the DAC 312-1 and the DAC 312-2 on the in-phase channel and the quadrature-phase channel are respectively configured to convert a plurality of input signals from digital domain to analog domain. The filter 313-1 and filter 313-2 are respectively configured to perform filtering on the received signals. The compensation device 311 is disposed on the transmitting signal processing path 310 and configured to receive a pair of input signals respectively come from the filter 313-1 on the in-phase channel (I) and from the filter 313-2 on the quadrature-phase channel (Q), process the received signals according to a pair of compensation values IDAC_I and IDAC_Q for LO leakage compensation to generate a pair of compensated signals. The compensation values IDAC_I and IDAC_Q may respectively be the value provided for compensation in the amplitude or the phase on the in-phase channel and the quadrature-phase channel. As an example, the compensation device 311 may add the compensation value IDAC_I to the input signal on the in-phase channel (I) and add the compensation value IDAC_Q to the input signal on the quadrature-phase channel (Q), so as to reduce the LO leakage. According to an embodiment of the invention, the compensation values IDAC_I and IDAC_Q are real numbers.

The mixer 314-1 and mixer 314-2 are respectively configured to multiply the received signals, e.g. the aforementioned compensated signals, with an oscillating signal LO_Sig to convert the received signal from baseband to radio frequency signal. The oscillating signals LO provided to the mixer 314-1 and mixer 314-2 is a collective representation of two signals having the same frequency and quadrature in phase. In the embodiments of the invention, the oscillating signal LO_Sig has an oscillating frequency LO. The adder 315 is configured to combine the signal on the in-phase channel and the signal on the quadrature-phase channel. The buffer circuit 316 may be a driving circuit of the power amplifier 317 to buffer the received radio frequency signal and drive the power amplifier 317 in the subsequent stage. The power amplifier 317 is configured to amplify the radio frequency signal before it is sent out through the antenna.

In the embodiments of the invention, the feedback signal processing path 320 may comprise a plurality of feedback signal processing devices, such as a mixer 324, a Programmable Gain Amplifier (PGA) 323, an Analog to Digital Converter (ADC) 322, a power spectrum density calculation device 321 and a digital signal processor 325. The feedback signal processing path 320 may be coupled to an output terminal of at least one transmitting signal processing device, for example, an output terminal of the buffer circuit 316, to receive an output signal generated by the transmitting signal processing device from the output terminal as a feedback signal and process the feedback signal. The output signal is a signal that has been processed by the aforementioned transmitting signal processing device, including the signal processing respectively performed on the in-phase channel and the quadrature channel. The mixer 324 is configured to multiply the received feedback signal with itself to down convert the feedback signal to the baseband signal. The PGA 323 is configured to amplify (or, attenuate) the received feedback signal. The ADC 322 is configured to convert the feedback signal from analog domain to digital domain. The power spectrum density calculation device 321 is configured to perform FFT on the received feedback signal so as to generate the feedback signal in frequency domain and calculate distribution of energy of the feedback signal in frequency domain based on the frequency domain feedback signal. The digital signal processor 325 is coupled to the power spectrum density calculation device 321 and the compensation device 311 and is configured to perform a calibration operation according to the feedback signal in frequency domain to calibrate one or more compensation values utilized by the compensation device 311.

In the embodiments of the invention, the power amplifier 317, the antenna and the devices on the transmitting signal processing path 310 may be as a whole regarded as a transmitter, and one or more devices on the feedback signal processing path 320 may be as a whole regarded as a compensation value calibration device to assist the execution of the calibration operation.

As discussed above, besides the IQ imbalance, the LO leakage on the transmitting signal processing path may be another type of RF impairment. That is, the output signal generated by the transmitting signal processing device may further comprise the energy or power of the unwanted local oscillating signal.

Figure 6:
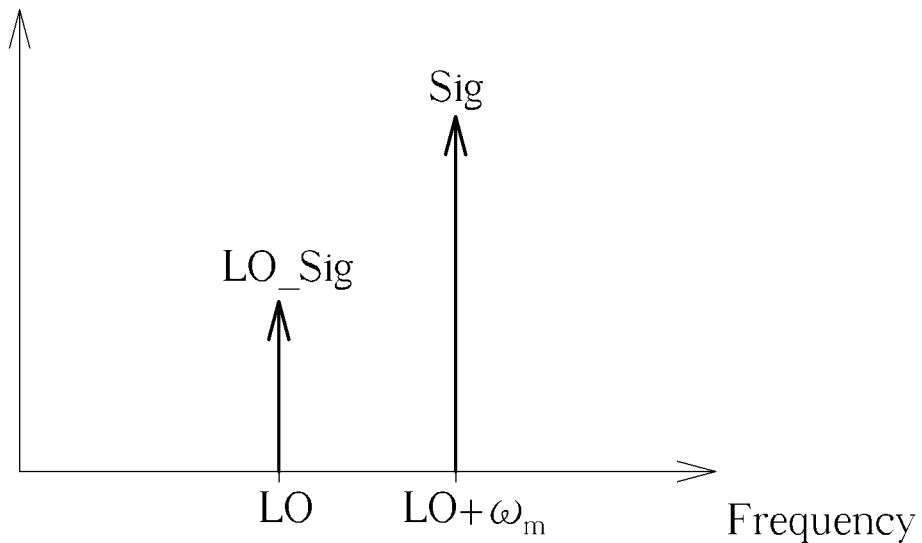
FIG. 6 shows an exemplary frequency spectrum of an RF signal.

FIG. 6 shows an exemplary frequency spectrum of an RF signal, where the RF signal shown in this embodiment is the one obtained at the output terminal of the buffer circuit 316. Suppose that the input signal Sig represents a pair of single tone signals with angular frequency corn, such as the pair of cosine signal cos $\omega_m t$ and the sine signal sin $\omega_m t$ having the angular frequency $\omega_m$ as shown in FIG. 5. Due to the LO leakage, the spectrum of the RF signal contains not only the energy (or power) of the original signal Sig at frequency (Lo+$\omega_m$), but also the energy (or power) of the oscillating signal Lo_Sig at oscillating frequency LO.

Figure 7:
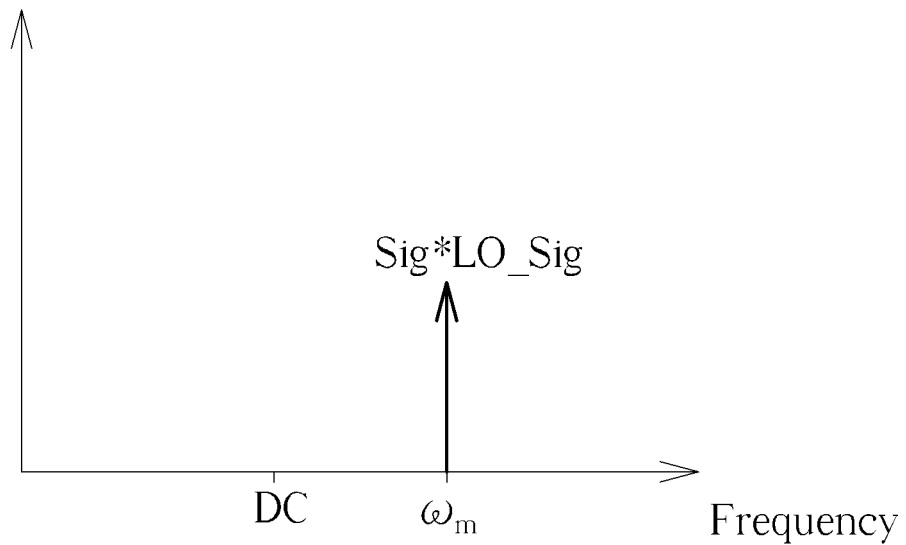
FIG. 7 shows an exemplary frequency spectrum of a feedback signal.

FIG. 7 shows an exemplary frequency spectrum of a feedback signal, which is the feedback signal obtained at the output terminal of the power spectrum density calculation device 321. Due to the existence of the oscillating signal Lo_Sig, the signal generated after the feedback signal is processed by the mixer 124 has some power that cannot be ignored at a frequency ($\omega_m$), such as the signal Sig*LO_Sig at the frequency ($\omega_m$) as shown in FIG. 5, whose energy is proportional to the value regarding a multiplication result of the corresponding amplitudes Sig*LO_Sig.

Therefore, according to an embodiment of the invention, the compensation device 311 may be configured to perform compensation on the received signals to compensate for the LO leakage according to a pair of compensation values IDAC_I and IDAC_Q, so as to reduce or minimize the energy of LO leakage generated on the transmitting signal processing path, thereby solving the LO leakage problem. When processing the RF impairment due to LO leakage, the compensation value calibration device may try to minimize the power or energy at the predetermined frequency of the feedback signal which is generated after the processing of the mixer 124, and the predetermined frequency may be equal to the input frequency of the input signals. As an example, when the angular frequency of the input signal is $\omega_m$, the predetermined frequency may be equal to the angular frequency $2\omega_m$. It is to be noted that the predetermined frequency may vary with the design of the mixer 324. As an example, when the mixer 324 is designed to multiply the feedback signal with a signal having another frequency different from $\omega_m$, the predetermined frequency is adjusted to another value obtained by adding the input frequency and said another frequency or obtained by subtracting said another frequency from the input frequency.

The greater the difference between the energy (or power) of the RF signal at the frequency (LO+$\omega_m$) and the energy (or power) at the frequency LO, the smaller the LO leakage. Therefore, the compensation device 311 may compensate for the LO leakage on the transmitting signal processing path based on the compensation values IDAC_I and IDAC_Q, so as to reduce the energy of the RF signal at the frequency LO, thereby reducing the energy of the feedback signal at the frequency $\omega_m$, and the compensation value calibration device may be configure to calibrated one or more compensation values utilized by the compensation device 311, so as to optimize the compensation result.

Figure 8:
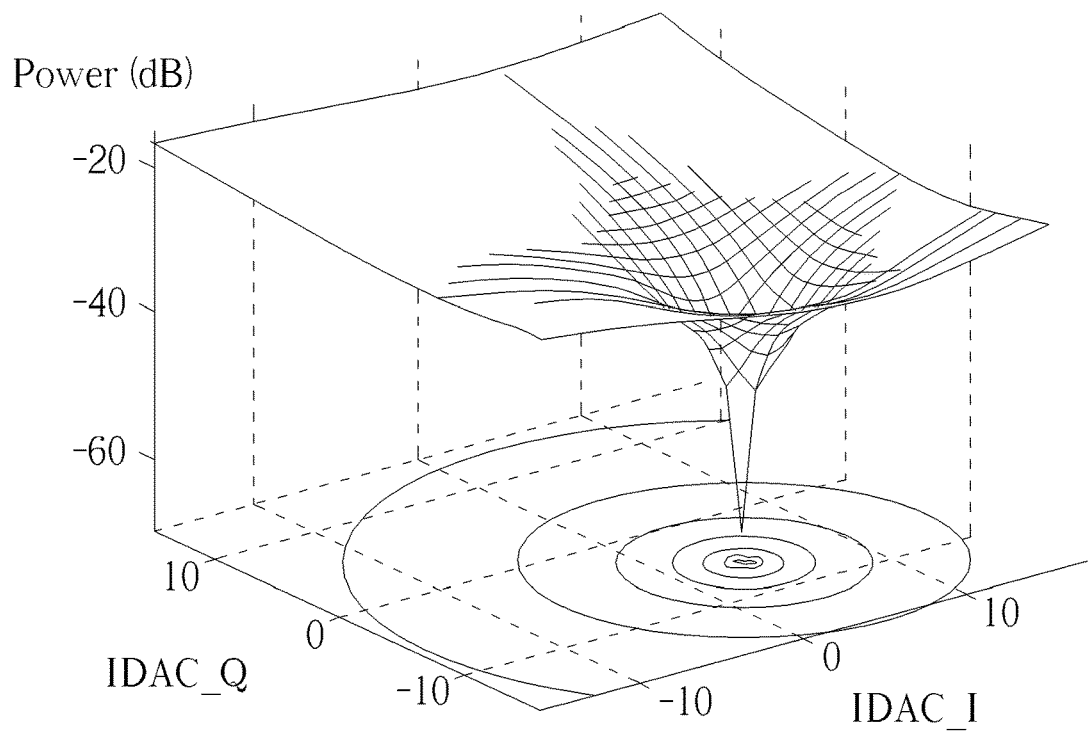
FIG. 8 is a schematic diagram showing the relationship between the LO leakage compensation values and the energy of the feedback signal at the aforementioned predetermined frequency.

FIG. 8 is a schematic diagram showing the relationship between the LO leakage compensation values IDAC_I and IDAC_Q and the energy of the feedback signal at the aforementioned predetermined frequency, where the predetermined frequency is equal to the input frequency of the input signal. As discussed above, since the energy of the feedback signal at the predetermined frequency is proportional to the LO leakage, the smaller energy of the feedback signal at the predetermined frequency means that the smaller LO leakage in the transmitter circuit 100. Therefore, in the embodiments of the invention, by finding out the compensation values IDAC_I and IDAC_Q that make the feedback signal has minimum energy at the predetermined frequency, the problem of LO leakage in the transmitter circuit 300 may be solved and optimum compensation result may be achieved. As shown in FIG. 8, the relationship between the compensation values IDAC_I and IDAC_Q and the energy of the feedback signal at the aforementioned predetermined frequency may also approximate a Quadratic function.

Since the relationship between the compensation values CMP_X, CMP_Y and the energy of the feedback signal at the predetermined frequency which is twice the input frequency $\omega_m$ may be approximated as a quadratic function, in the embodiment of the invention, the compensation of IQ imbalance may be regarded as a matter of optimization, where a method for calibrating one or more IQ imbalance compensation values may be implemented to obtain the optimal solution of the quadratic function, thereby finding out the better or optimal compensation values CMP_X and CMP_Y suitable for the transmitter circuit 100. Similarly, since the relationship between the compensation values IDAC_I, IDAC_Q and the energy of the feedback signal at a predetermined frequency which is equal to the input frequency $\omega_m$ may also be approximated as a quadratic function, in the embodiment of the invention, the compensation of LO leakage may also be regarded as a matter of optimization, where a method for calibrating one or more LO leakage compensation values may be implemented to obtain the optimal solution of the quadratic function, thereby finding out the better or optimal compensation values IDAC_I and IDAC_Q.

According to an embodiment of the invention, the matter of optimization may be expressed as the following equation Eq. (1):

$$(x_i^{opt}, x_q^{opt}) = \arg\min_{x_i, x_q} y(x_i, x_q) \quad \text{Eq. (1)}$$

where the cost function $y(x_i, x_q)$ may be a quadratic function having two variables $x_i$ and $x_q$, the parameters $x_i^{opt}$ and $x_q^{opt}$ may be the optimal solutions corresponding to the minimum y, and the cost function $y(x_i, x_q)$ may be expressed as the following equation Eq. (2):

$$y(x_i, x_q) = a \times x_i^2 + b \times x_q^2 + c \times x_i \times x_q + d \times x_i + e \times x_q + f \quad \text{Eq. (2)}$$

where a, b, c, d, e and f are a plurality of coefficients of the cost function $y(x_i, x_q)$.

In the embodiments of the invention, by having the compensation value CMP_X correspond to $x_i$, the compensation value CMP_Y correspond to $x_q$, and the energy of the feedback signal correspond to y, the proposed method for calibrating the compensation values may be applied to obtain the optimal solution for compensating for the IQ imbalance. Similarly, by having the compensation value IDAC_I correspond to $x_i$, the compensation value IDAC_Q correspond to $x_q$, and the energy of the feedback signal correspond to y, the same method for calibrating the compensation values may be applied to obtain the optimal solution for compensating for the LO leakage. It is to be noted that, as discussed above, in the embodiments of the invention, when processing the RF impairment due to IQ imbalance, the predetermined frequency may be twice the input frequency of the input signals, and when processing the RF impairment due to LO leakage, the predetermined frequency may be equal to the input frequency of the input signals.

The proposed method for calibrating the compensation values will be explained in more detailed in the following paragraphs.

The following equations Eq. (3) and Eq. (4) may be obtained by partially differentiating the cost function $y(x_i, x_q)$ on $x_i$ and $x_q$, respectively:

$$\frac{\partial y(x_i, x_q)}{\partial x_i} = 2ax_i + cx_q + d = 0 \quad \text{Eq. (3)}$$

$$\frac{\partial y(x_i, x_q)}{\partial x_q} = cx_i + 2bx_q + e = 0 \quad \text{Eq. (4)}$$

By solving the simultaneous equations of Eq. (3) and Eq. (4), optimal solution may be obtained. Therefore, the equations Eq. (3) and Eq. (4) are rewritten into matrix form as the following equation Eq. (5):

$$\begin{bmatrix} 2a & c \\ c & 2b \end{bmatrix} \begin{bmatrix} x_i \\ x_q \end{bmatrix} = \begin{bmatrix} -d \\ -e \end{bmatrix} \quad \text{Eq. (5)}$$

The equation Eq. (6) to obtain the optimal parameters $x_i^{opt}$ and $x_q^{opt}$ may be further derived by using the equation Eq. (5) as the derivation show below:

$$\begin{bmatrix} x_i \\ x_q \end{bmatrix} = \begin{bmatrix} 2a & c \\ c & 2b \end{bmatrix}^{-1} \begin{bmatrix} -d \\ -e \end{bmatrix} \quad \text{Eq. (6)}$$

$$\begin{bmatrix} x_i^{opt} \\ x_q^{opt} \end{bmatrix} = \begin{bmatrix} x_i \\ x_q \end{bmatrix} = \frac{1}{4ab - c^2} \begin{bmatrix} -2bd + ce \\ cd - 2ae \end{bmatrix}$$

It can be seen from equation Eq. (6) that when the coefficients a, b, c, d, e and f of the cost function $y(x_i, x_q)$ are obtained, the optimal parameters $x_i^{opt}$ and $x_q^{opt}$ are obtained. Therefore, in the embodiments of the invention, six pairs of parameters $(x_{i1}, x_{q1})$, $(x_{i2}, x_{q2})$, $(x_{i3}, x_{q3})$, $(x_{i4}, x_{q4})$, $(x_{i5}, x_{q5})$, $(x_{i6}, x_{q6})$ are set, and assuming that the output values $y_1, y_2, y_3, y_4, y_5, y_6$ are the values respectively obtained by bringing the six pairs of parameters into the cost function, six equations will be obtained by bringing the six pairs of parameters into the cost function shown in equation Eq. (2) to obtain, and six equations are arranged as simultaneous equations to obtain the matrix function as the following equation Eq. (7):

$$\begin{bmatrix} y_1 \\ y_2 \\ y_3 \\ y_4 \\ y_5 \\ y_6 \end{bmatrix} = \begin{bmatrix} x_{i1}^2 & x_{q1}^2 & x_{i1} \times x_{q1} & x_{i1} & x_{q1} & 1 \\ x_{i2}^2 & x_{q2}^2 & x_{i2} \times x_{q2} & x_{i2} & x_{q2} & 1 \\ x_{i3}^2 & x_{q3}^2 & x_{i3} \times x_{q3} & x_{i3} & x_{q3} & 1 \\ x_{i4}^2 & x_{q4}^2 & x_{i4} \times x_{q4} & x_{i4} & x_{q4} & 1 \\ x_{i5}^2 & x_{q5}^2 & x_{i5} \times x_{q5} & x_{i5} & x_{q5} & 1 \\ x_{i6}^2 & x_{q6}^2 & x_{i6} \times x_{q6} & x_{i6} & x_{q6} & 1 \end{bmatrix} \begin{bmatrix} a \\ b \\ c \\ d \\ e \\ f \end{bmatrix} \quad \text{Eq. (7)}$$

Then, the Cramer's Rule is applied to obtain the ways to calculate the coefficients a, b, c, d and e, which are expressed together as the following equation Eq. (8):

$$a = \frac{\Delta_a}{\Delta}; b = \frac{\Delta_b}{\Delta}; c = \frac{\Delta_c}{\Delta}; d = \frac{\Delta_d}{\Delta}; e = \frac{\Delta_e}{\Delta} \quad \text{Eq. (8)}$$

The determinant $\Delta$ may be calculated based on the following equation Eq. (9):

$$\Delta = \begin{bmatrix} x_{i1}^2 & x_{q1}^2 & x_{i1} \times x_{q1} & x_{i1} & x_{q1} & 1 \\ x_{i2}^2 & x_{q2}^2 & x_{i2} \times x_{q2} & x_{i2} & x_{q2} & 1 \\ x_{i3}^2 & x_{q3}^2 & x_{i3} \times x_{q3} & x_{i3} & x_{q3} & 1 \\ x_{i4}^2 & x_{q4}^2 & x_{i4} \times x_{q4} & x_{i4} & x_{q4} & 1 \\ x_{i5}^2 & x_{q5}^2 & x_{i5} \times x_{q5} & x_{i5} & x_{q5} & 1 \\ x_{i6}^2 & x_{q6}^2 & x_{i6} \times x_{q6} & x_{i6} & x_{q6} & 1 \end{bmatrix} \quad \text{Eq. (9)}$$

The determinant $\Delta_a$ may be calculated based on the following equation Eq. (10):

$$\Delta_a = \begin{bmatrix} y_1 & x_{q1}^2 & x_{i1} \times x_{q1} & x_{i1} & x_{q1} & 1 \\ y_2 & x_{q2}^2 & x_{i2} \times x_{q2} & x_{i2} & x_{q2} & 1 \\ y_3 & x_{q3}^2 & x_{i3} \times x_{q3} & x_{i3} & x_{q3} & 1 \\ y_4 & x_{q4}^2 & x_{i4} \times x_{q4} & x_{i4} & x_{q4} & 1 \\ y_5 & x_{q5}^2 & x_{i5} \times x_{q5} & x_{i5} & x_{q5} & 1 \\ y_6 & x_{q6}^2 & x_{i6} \times x_{q6} & x_{i6} & x_{q6} & 1 \end{bmatrix} \quad \text{Eq. (10)}$$

The determinant $\Delta_b$ may be calculated based on the following equation Eq. (11):

$$\Delta_b = \begin{bmatrix} x_{i1}^2 & y_1 & x_{i1} \times x_{q1} & x_{i1} & x_{q1} & 1 \\ x_{i2}^2 & y_2 & x_{i2} \times x_{q2} & x_{i2} & x_{q2} & 1 \\ x_{i3}^2 & y_3 & x_{i3} \times x_{q3} & x_{i3} & x_{q3} & 1 \\ x_{i4}^2 & y_4 & x_{i4} \times x_{q4} & x_{i4} & x_{q4} & 1 \\ x_{i5}^2 & y_5 & x_{i5} \times x_{q5} & x_{i5} & x_{q5} & 1 \\ x_{i6}^2 & y_6 & x_{i6} \times x_{q6} & x_{i6} & x_{q6} & 1 \end{bmatrix} \quad \text{Eq. (11)}$$

The determinant $\Delta_c$ may be calculated based on the following equation Eq. (12):

$$\Delta_c = \begin{bmatrix} x_{i1}^2 & x_{q1}^2 & y_1 & x_{i1} & x_{q1} & 1 \\ x_{i2}^2 & x_{q2}^2 & y_2 & x_{i2} & x_{q2} & 1 \\ x_{i3}^2 & x_{q3}^2 & y_3 & x_{i3} & x_{q3} & 1 \\ x_{i4}^2 & x_{q4}^2 & y_4 & x_{i4} & x_{q4} & 1 \\ x_{i5}^2 & x_{q5}^2 & y_5 & x_{i5} & x_{q5} & 1 \\ x_{i6}^2 & x_{q6}^2 & y_6 & x_{i6} & x_{q6} & 1 \end{bmatrix} \quad \text{Eq. (12)}$$

The determinant $\Delta_d$ may be calculated based on the following equation Eq. (13):

$$\Delta_d = \begin{bmatrix} x_{i1}^2 & x_{q1}^2 & x_{i1} \times x_{q1} & y_1 & x_{q1} & 1 \\ x_{i2}^2 & x_{q2}^2 & x_{i2} \times x_{q2} & y_2 & x_{q2} & 1 \\ x_{i3}^2 & x_{q3}^2 & x_{i3} \times x_{q3} & y_3 & x_{q3} & 1 \\ x_{i4}^2 & x_{q4}^2 & x_{i4} \times x_{q4} & y_4 & x_{q4} & 1 \\ x_{i5}^2 & x_{q5}^2 & x_{i5} \times x_{q5} & y_5 & x_{q5} & 1 \\ x_{i6}^2 & x_{q6}^2 & x_{i6} \times x_{q6} & y_6 & x_{q6} & 1 \end{bmatrix} \quad \text{Eq. (13)}$$

The determinant $\Delta_e$ may be calculated based on the following equation Eq. (14):

$$\Delta_e = \begin{bmatrix} x_{i1}^2 & x_{q1}^2 & x_{i1} \times x_{q1} & x_{i1} & y_1 & 1 \\ x_{i2}^2 & x_{q2}^2 & x_{i2} \times x_{q2} & x_{i2} & y_2 & 1 \\ x_{i3}^2 & x_{q3}^2 & x_{i3} \times x_{q3} & x_{i3} & y_3 & 1 \\ x_{i4}^2 & x_{q4}^2 & x_{i4} \times x_{q4} & x_{i4} & y_4 & 1 \\ x_{i5}^2 & x_{q5}^2 & x_{i5} \times x_{q5} & x_{i5} & y_5 & 1 \\ x_{i6}^2 & x_{q6}^2 & x_{i6} \times x_{q6} & x_{i6} & y_6 & 1 \end{bmatrix} \quad \text{Eq. (14)}$$

According to an embodiment of the invention, the coefficients a, b, c, d and e obtained through the equation Eq. (8) are then brought back to equation Eq. (6) to obtain the optimal parameters $x_i^{opt}$ and $x_q^{opt}$.

To be more specific, according to an embodiment of the invention, the digital signal processor 125/325 may set a plurality of pairs of different compensation values as the aforementioned parameters ($x_i$, $x_q$) in advance, and sequentially provide the plurality of pairs of compensation values to the corresponding compensation device 111/311. The compensation device 111/311 is configured to sequentially process a pair of input signals, such as the pair of cosine signal cos $\omega_m t$ and sine signal sin $\omega_m t$ shown in FIG. 1 and FIG. 5, according to the plurality of pairs of compensation values sequentially received to generate a plurality of pairs of compensated signals. The transmitting signal processing devices disposed on the transmitting signal processing path 120/320 are sequentially configured to process the plurality of pairs of compensated signals to generate a plurality of pairs of output signals. The compensation value calibration device disposed on the feedback signal processing path 120/320 is configured to receive the output signals, sequentially, from an output terminal of the transmitting signal processing path 110/310 as a plurality of feedback signals and perform a calibration operation according to the feedback signals and the plurality of pairs of compensation values.

The digital signal processor 125/325 may obtain the matrix function as equation Eq. (7) according to a matrix formed by the plurality of pairs of compensation values and a row vector formed by energy of the feedback signals at a predetermined frequency, and calculate a plurality of determinants by using the aforementioned equations Eq. (9)-Eq. 14. The obtained determinants may be applied in the aforementioned equation Eq. (8) to determine the coefficients a, b, c, d, e and f of the cost function.

According to an embodiment of the invention, the pair of input signals may be a pair of single tone signals with an input frequency, such as the pair of cosine signal cos $\omega_m t$ and the sine signal sin $\omega_m t$ having the angular frequency $\omega_m$. As discussed above, in the embodiments of the invention, when processing the RF impairment due to IQ imbalance, the predetermined frequency may be twice the input frequency of the input signals, and when processing the RF impairment due to LO leakage, the predetermined frequency may be equal to the input frequency of the input signals.

Therefore, in the embodiments of the invention, the power spectrum density calculation device 121/321 is configured to perform Fast Fourier Transform (FFT) on a plurality of feedback signals received from the transmitter and after being processed by the mixer to generate corresponding frequency domain feedback signals and calculate distribution of energy of the feedback signals in frequency domain based on the frequency domain feedback signals. When calibrating the compensation values of the IQ imbalance to obtain the optimal solutions, the digital signal processor 125 may obtain the value of calculated energy of the feedback signals at twice the input frequency from the power spectrum density calculation device 121 as the corresponding output value of the cost function, such as the values $y_1$, $y_2$, $y_3$, $y_4$, $y_5$, $y_6$ as shown in equation Eq. (7), use the aforementioned equation Eq. (8) to determine the coefficients a, b, c, d, e and f of the cost function and use the aforementioned equation Eq. (6) to determine the calibrated compensation values CMP_X and COM Y. Similarly, when calibrating the compensation values of the LO leakage to obtain the optimal solutions, the digital signal processor 325 may obtain the value of calculated energy of the feedback signals at the input frequency from the power spectrum density calculation device 321 as the corresponding output value of the cost function, such as the values $y_1$, $y_2$, $y_3$, $y_4$, $y_5$, $y_6$ as shown in equation Eq. (7), use the aforementioned equation Eq. (8) to determine the coefficients a, b, c, d, e and f of the cost function and use the aforementioned equation Eq. (6) to determine the calibrated compensation values IDAC_I and IDAC_Q.

Therefore, in the embodiments of calibrating IQ imbalance compensation values, the pair of calibrated compensation values is a pair of compensation values that make a feedback signal corresponding to an output signal generated by the transmitter in response to a pair of input signals has minimum energy at a predetermined frequency which is twice the input frequency of the input signal. In the embodiments of calibrating LO leakage compensation values, the pair of calibrated compensation values is a pair of compensation values that make a feedback signal corresponding to an output signal generated by the transmitter in response to a pair of input signals has minimum energy at a predetermined frequency which is equal to the input frequency of the input signal.

After obtaining the calibrated compensation values, the compensation device 111/311 may further process the subsequently received input signals according to the calibrated compensation values, so as to optimize the compensation result.

Figure 9:
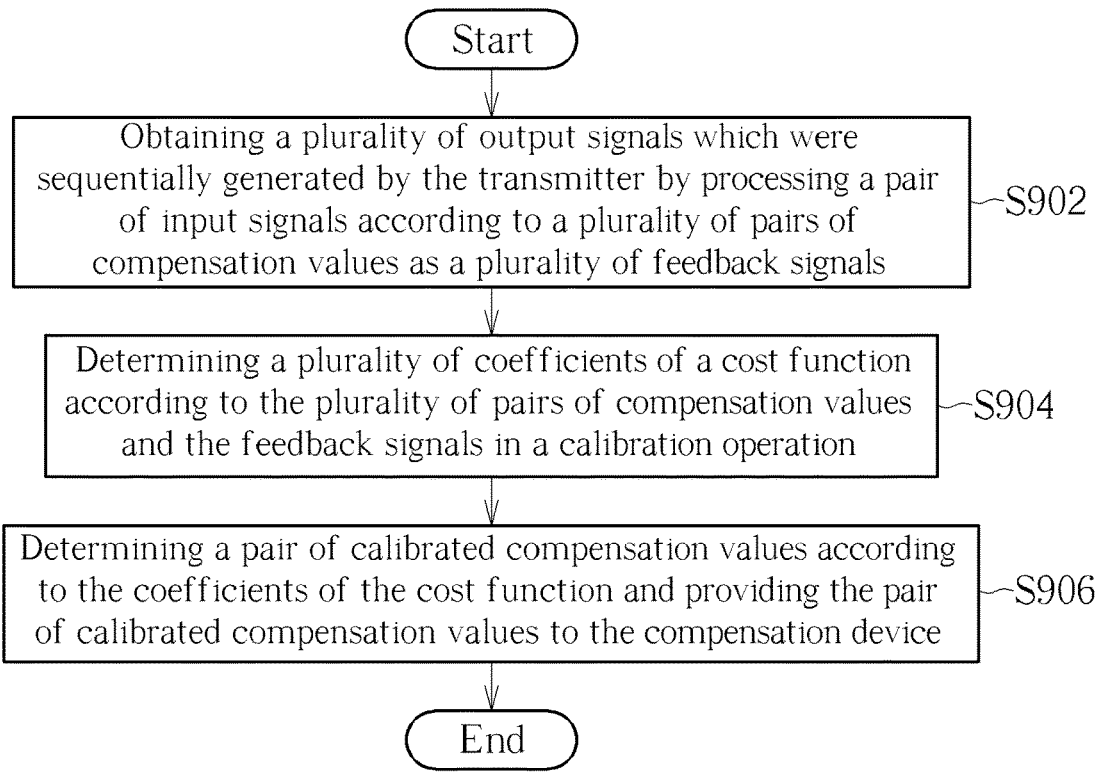
FIG. 9 is a flowchart of a method for calibrating one or more compensation values utilized by a compensation device of a transmitter according to an embodiment of the invention

FIG. 9 is a flowchart of a method for calibrating one or more compensation values utilized by a compensation device of a transmitter according to an embodiment of the invention. The proposed method for calibrating one or more compensation values comprises the following steps:

Step S902: obtaining a plurality of output signals which were sequentially generated by the transmitter by processing a pair of input signals according to a plurality of pairs of compensation values as a plurality of feedback signals. Each feedback signal corresponds to one of the plurality of pairs of compensation values.

Step S904: determining a plurality of coefficients of a cost function according to the plurality of pairs of compensation values and the feedback signals in a calibration operation.

Step S906: determining a pair of calibrated compensation values according to the coefficients of the cost function and providing the pair of calibrated compensation values to the compensation device Noted that although FIG. 1 and FIG. 5 respectively shows an exemplary transmitter circuit, it should be understood that FIG. 1 and FIG. 5 are simplified schematic diagrams of a transmitter circuit, in which only the components related to the invention are shown. Those skilled in the art will readily understand that the transmitter circuit may further comprise many components not shown in the figures to implement the functions of wireless communication and related signal processing, thus the invention should not be limited thereto. For example, the proposed method for calibrating compensation values may also be applied to the transmitter circuits with a plurality of compensation devices configured therein, and the compensation values used by different compensation devices may all be calibrated via the proposed method for calibrating compensation values.

Figure 10:
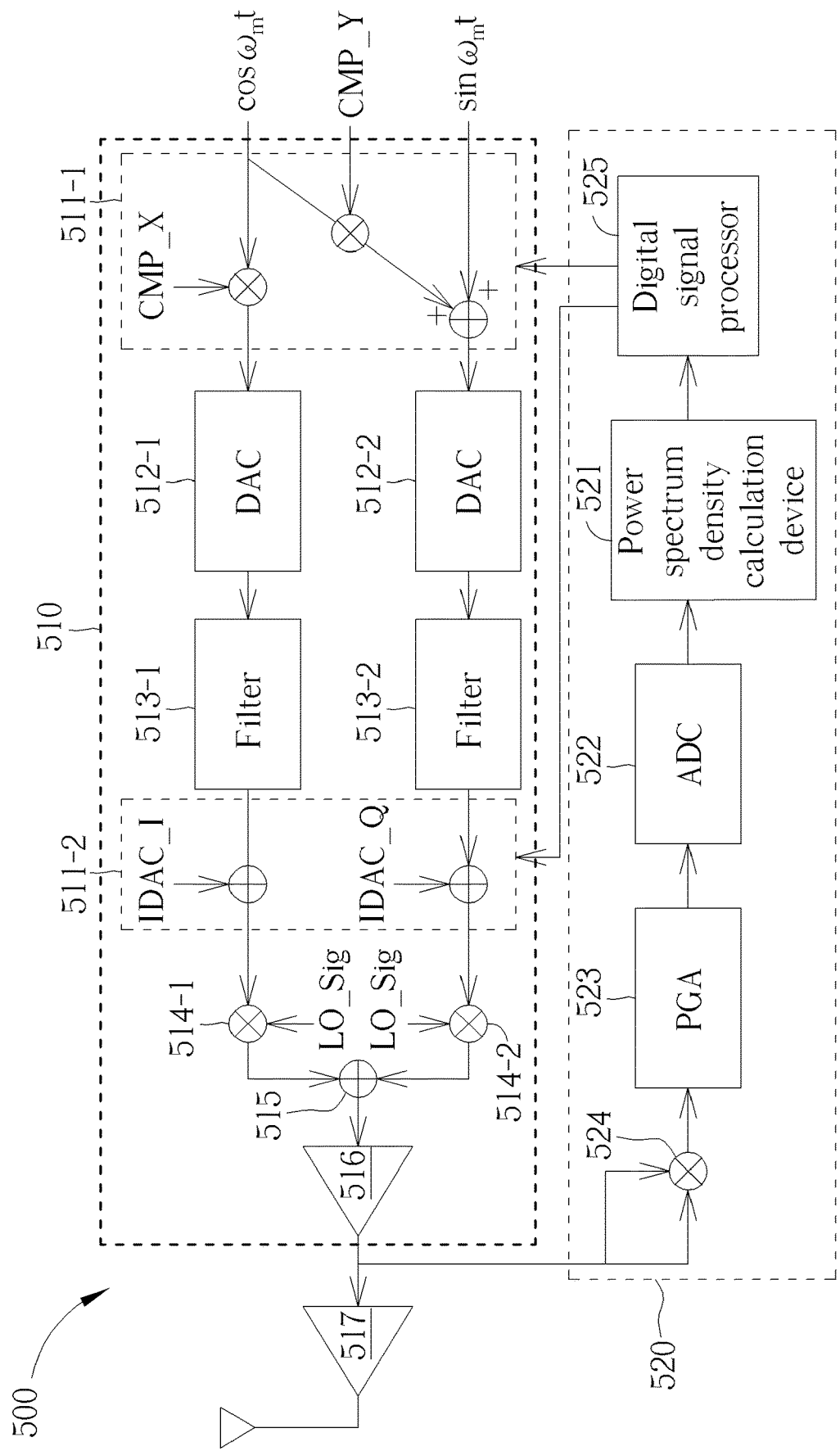
FIG. 10 shows yet another exemplary transmitter circuit according to an embodiment of the invention.

FIG. 10 shows yet another exemplary transmitter circuit according to an embodiment of the invention. The transmitter circuit 500 may comprise a transmitting signal processing path 510 and a feedback signal processing path 520. The transmitting signal processing path 510 may comprise a plurality of stages of transmitting signal processing devices configured to process the transmitting signal, as an example, the transmitting signal processing path 510 may comprise compensation devices 511-1 and 511-2, Digital to Analog Converters (DAC) 512-1 and 512-2, filters 513-1 and 513-2 and mixers 514-1 and 514-2 which are respectively disposed on the in-phase channel and the quadrature-phase channel, and an adder 515 and a buffer circuit 516.

The feedback signal processing path 520 may comprise a plurality of feedback signal processing devices, such as a mixer 524, a Programmable Gain Amplifier (PGA) 523, an Analog to Digital Converter (ADC) 522, a power spectrum density calculation device 521 and a digital signal processor 525. One or more devices on the feedback signal processing path 520, such as the power spectrum density calculation device 521 and the digital signal processor 525, may be as a whole regarded as a compensation value calibration device to assist the execution of the calibration operation.

The components comprised in the transmitter circuit 500 shown in FIG. 10 are substantially the same as those in the transmitter circuit 100 or 300, but different in that the transmitter circuit 500 comprises multiple compensation devices. Like reference numerals refer to the same elements, and thus detailed descriptions for the same elements are omitted here for brevity.

In the embodiments of the invention, the compensation value calibration device may sequentially calibrate the compensation values utilized by each compensation device based on the proposed method for calibrating the compensation values. As an example, the compensation value calibration device may first calibrate the compensation values CMP_X and CMP_Y used by the compensation device 511-1 based on the proposed method to obtain the better or the optimal compensation values CMP_X and CMP_Y, then the compensation value calibration device may calibrate the compensation values IDAC_I and IDAC_2 used by the compensation device 511-2 based on the proposed method to obtain the better or the optimal compensation values IDAC_I and IDAC_2. In addition, the compensation value calibration device may repeatedly calibrate the compensation values used by the compensation devices 511-1 and 511-2 in an iterative manner, as an example, taking the obtained better compensation values as one of the plurality of pairs of compensation values and perform calibration on the compensation values, again. Therefore, the invention is not limited to performing the calibration only once, and the compensation value calibration device may also perform multiple times of calibration on the compensation values used by the compensation device 511-1 and/or 511-2 to obtain better or optimal compensation values.

In the embodiments of the invention, a method for calibrating compensation values is proposed to solve different RF impairment problems by obtaining the corresponding compensation values for dealing with said different RF impairment problems in an efficient way. By applying the proposed method, better or optimal compensation values may be obtained through the corresponding calibration operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitter circuit, comprising:
   a compensation device, disposed on a transmitting signal processing path and configured to sequentially process a pair of input signals according to a plurality of pairs of compensation values to generate a plurality of pairs of compensated signals;
   at least one transmitting signal processing device, disposed on the transmitting signal processing path and configured to sequentially process the plurality of pairs of compensated signals to generate a plurality of output signals; and
   a compensation value calibration device, coupled to an output terminal of the transmitting signal processing path and configured to sequentially receive the output signals from the output terminal as a plurality of feedback signals and perform a calibration operation according to the feedback signals and the plurality of pairs of compensation values, wherein the compensation value calibration device comprises:
   a digital signal processor, coupled to the compensation device and, in the calibration operation, configured to determine a plurality of coefficients of a cost function according to the plurality of pairs of compensation values and the feedback signals, determine a pair of calibrated compensation values according to the coefficients and provide the pair of calibrated compensation values to the compensation device.

2. The transmitter circuit as claimed in claim 1, wherein the pair of input signals is a pair of single tone signals with an input frequency.

3. The transmitter circuit as claimed in claim 2, wherein the pair of calibrated compensation values is a pair of compensation values that make a feedback signal corresponding to an output signal generated on the transmitting signal processing path in response to the pair of input signals has minimum energy at a predetermined frequency, and the predetermined frequency equals to the input frequency.

4. The transmitter circuit as claimed in claim 2, wherein the pair of calibrated compensation values is a pair of compensation values that make a feedback signal corresponding to an output signal generated on the transmitting signal processing path in response to the pair of input signals has minimum energy at a predetermined frequency, and the predetermined frequency is twice the input frequency.

5. The transmitter circuit as claimed in claim 2, wherein after receiving the pair of calibrated compensation values, the compensation device is further configured to process the pair of input signals subsequently received according to the pair of calibrated compensation values.

6. The transmitter circuit as claimed in claim 1, wherein the digital signal processor is configured to calculate a plurality of determinants according to a matrix formed by the plurality of pairs of compensation values and a row vector formed by energy of the feedback signals at a predetermined frequency, and determine the coefficients according to the determinants.

7. The transmitter circuit as claimed in claim 1, wherein the cost function is a quadratic function.

8. A compensation value calibration device, for calibrating one or more compensation values utilized by a compensation device in a transmitter, comprising:
    a power spectrum density calculation device, configured to perform Fast Fourier Transform (FFT) on a plurality of feedback signals received from the transmitter to generate corresponding frequency domain feedback signals and calculate distribution of energy of the feedback signals in frequency domain based on the frequency domain feedback signals, wherein each feedback signal corresponds to one of a plurality of pairs of compensation values; and
    a digital signal processor, coupled to the compensation device the power spectrum density calculation device and configured to, in a calibration operation, determine a plurality of coefficients of a cost function according to the plurality pairs of compensation values and the feedback signals, determine a pair of calibrated compensation values according to the coefficients and provide the pair of calibrated compensation values to the compensation device.

9. The compensation value calibration device as claimed in claim 8, wherein the pair of calibrated compensation values is a pair of compensation values that make a feedback signal corresponding to an output signal generated by the transmitter in response to a pair of input signals has minimum energy at a predetermined frequency, and the predetermined frequency equals to an input frequency of the pair of input signals.

10. The compensation value calibration device as claimed in claim 8, wherein the pair of calibrated compensation values is a pair of compensation values that make a feedback signal corresponding to an output signal generated by the transmitter in response to a pair of input signals has minimum energy at a predetermined frequency, and the predetermined frequency is twice an input frequency of the pair of input signals.

11. The compensation value calibration device as claimed in claim 8, wherein in the calibration operation, the digital signal processor is further configured to calculate a plurality of determinants according to a matrix formed by the plurality of pairs of compensation values and a row vector formed by energy of the feedback signals at a predetermined frequency, and determine the coefficients according to the determinants.

12. The compensation value calibration device as claimed in claim 8, wherein the cost function is a quadratic function.

13. A method for calibrating one or more compensation values utilized by a compensation device of a transmitter, comprising:
    obtaining a plurality of output signals which were sequentially generated by the transmitter by processing a pair of input signals according to a plurality of pairs of compensation values as a plurality of feedback signals, wherein each feedback signal corresponds to one of the plurality of pairs of compensation values;
    determining a plurality of coefficients of a cost function according to the plurality of pairs of compensation values and the feedback signals in a calibration operation; and
    determining a pair of calibrated compensation values according to the coefficients and providing the pair of calibrated compensation values to the compensation device.

14. The method as claimed in claim 13, wherein the pair of input signals is a pair of single tone signals with an input frequency, the pair of calibrated compensation values is a pair of compensation values that make a feedback signal corresponding to an output signal generated by the transmitter in response to the pair of input signals has minimum energy at a predetermined frequency, and the predetermined frequency equals to the input frequency.

15. The method as claimed in claim 13, the pair of input signals is a pair of single tone signals with an input frequency, the pair of calibrated compensation values is a pair of compensation values that make a feedback signal corresponding to an output signal generated by the transmitter in response to the pair of input signals has minimum energy at a predetermined frequency, and the predetermined frequency is twice the input frequency.

* * * * *